US009707642B2

(12) United States Patent
Gerrard et al.

(10) Patent No.: US 9,707,642 B2
(45) Date of Patent: Jul. 18, 2017

(54) TOUGHENED SOLDER FOR DOWNHOLE APPLICATIONS, METHODS OF MANUFACTURE THEREOF AND ARTICLES COMPRISING THE SAME

(71) Applicants: David Peter Gerrard, Montgomery, TX (US); Sayantan Roy, Houston, TX (US)

(72) Inventors: David Peter Gerrard, Montgomery, TX (US); Sayantan Roy, Houston, TX (US)

(73) Assignee: BAKER HUGHES INCORPORATED, Houston, TX (US)

( * ) Notice: Subject to any disclaimer, the term of this patent is extended or adjusted under 35 U.S.C. 154(b) by 355 days.

(21) Appl. No.: 14/071,928

(22) Filed: Nov. 5, 2013

(65) Prior Publication Data

US 2014/0158255 A1  Jun. 12, 2014

Related U.S. Application Data

(60) Provisional application No. 61/734,633, filed on Dec. 7, 2012.

(51) Int. Cl.
| | |
|---|---|
| *B23K 35/02* | (2006.01) |
| *B23K 35/26* | (2006.01) |
| *B23K 35/28* | (2006.01) |
| *B23K 35/30* | (2006.01) |
| *B23K 35/32* | (2006.01) |
| *B23K 35/36* | (2006.01) |

(52) U.S. Cl.
CPC .......... *B23K 35/0244* (2013.01); *B23K 35/26* (2013.01); *B23K 35/266* (2013.01); *B23K 35/268* (2013.01); *B23K 35/286* (2013.01); *B23K 35/302* (2013.01); *B23K 35/3046* (2013.01); *B23K 35/3053* (2013.01); *B23K 35/32* (2013.01); *B23K 35/325* (2013.01); *B23K 35/3612* (2013.01); *B23K 35/3613* (2013.01)

(58) Field of Classification Search
CPC . B23K 35/0244; B23K 35/26; B23K 35/3612
USPC .......................................................... 148/23
See application file for complete search history.

(56) References Cited

U.S. PATENT DOCUMENTS

| | | | |
|---|---|---|---|
| 2,466,963 | A | 4/1949 | Patrick et al. |
| 3,487,052 | A | 12/1969 | Koons et al. |
| 3,600,341 | A | 8/1971 | Schmidt et al. |
| 3,699,087 | A | 10/1972 | Brown et al. |
| 3,705,131 | A | 12/1972 | Vladimirovich et al. |
| 3,737,411 | A | 6/1973 | Scoggins |
| 3,758,630 | A | 9/1973 | Bilow |
| 3,782,458 | A | 1/1974 | Slack |
| 3,792,099 | A | 2/1974 | Wang et al. |
| 3,793,281 | A | 2/1974 | Acle, Jr. |
| 3,954,932 | A | 5/1976 | Coale |
| 4,020,054 | A | 4/1977 | Fodor |
| 4,137,970 | A | 2/1979 | Laflin et al. |
| 4,191,254 | A | 3/1980 | Baughman et al. |
| 4,308,352 | A | 12/1981 | Knaus |
| 4,414,269 | A | 11/1983 | Lubowitz et al. |
| 4,415,269 | A | 11/1983 | Fraser |
| 4,431,761 | A | 2/1984 | Hergenrother |
| 4,475,847 | A | 10/1984 | Cornely et al. |
| 4,591,615 | A | 5/1986 | Aldred et al. |
| 4,690,972 | A | 9/1987 | Johnson et al. |
| 4,862,967 | A | 9/1989 | Harris |
| 4,940,733 | A | 7/1990 | Kuphal et al. |
| 5,086,125 | A | 2/1992 | Ohta et al. |
| 5,272,247 | A | 12/1993 | Sotokawa et al. |
| 5,488,084 | A | 1/1996 | Kadoi et al. |
| 5,580,931 | A | 12/1996 | Aguirre |
| 5,789,083 | A | 8/1998 | Thomas |

(Continued)

FOREIGN PATENT DOCUMENTS

| | | |
|---|---|---|
| EP | 2009723 A1 | 12/2008 |
| FR | 2135110 A1 | 12/1972 |

(Continued)

OTHER PUBLICATIONS

Collins et al., "Thermal Fatigue and Failure Analysis of SnAgCu Solder Alloys with Minor Pb Additions", IEEE Transactions on Components, Packaging and Manufacturing Tech. vol. 1, No. 10. pp. 1594-1600 (Oct. 2011)
Dan Lu et al., "Effects of Ball Milling Dispersion of Nano-SiOx Particles on Impact Strength and Crystallization Behavior of Nano-SiOx-Poly(phenylene sulfide) Nanocomposites," Polymer Engineering and Science, 2006, pp. 820-825.
Fu Guo, "Composite lead-free electronic solders", J Mater Sci: Mater Electron 18:129-145 (2007).
Richard T. Hawkins, "Chemistry of the Cure of Poly(p-phenylene sulfide)", Macromolecular, vol. 9, No. 2; pp. 189-194; (1976).
International Search Report and Written Opinion; International Application No. PCT/US2012/045550; International filing date: Jul. 5, 2012; Date of mailing Jan. 25, 2013; 8 pages.

(Continued)

*Primary Examiner* — Weiping Zhu
(74) *Attorney, Agent, or Firm* — Cantor Colburn LLP

(57) ABSTRACT

Disclosed herein is a solder composition comprising a metal or a metal alloy; and an electrically conductive high temperature polymeric composition; where the electrically conductive high temperature polymeric composition is dispersed homogeneously in the metal; and where the electrically conductive high temperature polymeric composition has a higher glass transition temperature or a melting point than the flow temperature of the metal or metal alloy. Disclosed herein too is a method comprising mixing an electrically conductive high temperature polymeric composition with a metal or a metal alloy to form the solder composition; where the electrically conductive high temperature polymeric composition is dispersed homogeneously in the metal; and where the electrically conductive high temperature polymeric composition has a higher glass transition temperature or a melting point than the flow temperature of the metal or metal alloy.

11 Claims, No Drawings

(56) References Cited

U.S. PATENT DOCUMENTS

| | | |
|---|---|---|
| 5,803,172 A | 9/1998 | Rajkovich |
| 5,886,130 A | 3/1999 | Trimmer et al. |
| 5,976,437 A | 11/1999 | Marrocco, III et al. |
| 6,001,934 A | 12/1999 | Yamanaka et al. |
| 6,160,239 A | 12/2000 | Cubero Pitel |
| 6,446,717 B1 | 9/2002 | White et al. |
| 6,485,806 B1 | 11/2002 | Tateyama et al. |
| 6,854,522 B2 | 2/2005 | Brezinski et al. |
| 6,896,063 B2 | 5/2005 | Chang et al. |
| 6,907,936 B2 | 6/2005 | Fehr et al. |
| 6,907,937 B2 | 6/2005 | Whanger et al. |
| 6,976,537 B1 | 12/2005 | Verret |
| 6,977,057 B2 | 12/2005 | Reitz et al. |
| 7,045,082 B2 | 5/2006 | Dietzen et al. |
| 7,109,249 B2 | 9/2006 | Bruza et al. |
| 7,268,193 B2 | 9/2007 | Marrocco, III et al. |
| 7,291,201 B2 | 11/2007 | Duh et al. |
| 7,387,158 B2 | 6/2008 | Murray et al. |
| 7,392,852 B2 | 7/2008 | Richard |
| 7,524,528 B2 * | 4/2009 | Kodas ............... C09D 11/30 29/620 |
| 7,615,476 B2 | 11/2009 | Hua |
| 7,655,705 B2 | 2/2010 | Scherzer et al. |
| 7,743,825 B2 | 6/2010 | O'Malley et al. |
| 8,048,348 B2 | 11/2011 | Duan et al. |
| 8,167,190 B1 | 5/2012 | Bullock et al. |
| 8,519,505 B2 | 8/2013 | Hiroshige et al. |
| 8,604,157 B2 | 12/2013 | Gerrard et al. |
| 8,939,222 B2 | 1/2015 | Ren et al. |
| 2003/0032739 A1 | 2/2003 | Kerres et al. |
| 2003/0069082 A1 | 4/2003 | Sullivan |
| 2003/0132271 A1 | 7/2003 | Kao et al. |
| 2004/0112478 A1 | 6/2004 | Bieler et al. |
| 2004/0138321 A1 | 7/2004 | Hashimoto et al. |
| 2004/0259446 A1 | 12/2004 | Jain et al. |
| 2004/0266940 A1 | 12/2004 | Issari |
| 2005/0089688 A1 | 4/2005 | Mungioli et al. |
| 2005/0205263 A1 | 9/2005 | Richard |
| 2006/0011267 A1 | 1/2006 | Kay et al. |
| 2006/0019090 A1 | 1/2006 | Wessling |
| 2006/0045395 A1 | 3/2006 | Shimazu et al. |
| 2006/0051540 A1 | 3/2006 | Kagawa |
| 2006/0124304 A1 | 6/2006 | Bloess et al. |
| 2006/0125136 A1 | 6/2006 | Kratzmuller |
| 2007/0020417 A1 | 1/2007 | Murakami |
| 2007/0021549 A1 | 1/2007 | Kojima et al. |
| 2007/0072828 A1 | 3/2007 | Yoo |
| 2007/0106050 A1 | 5/2007 | Sokolowski et al. |
| 2007/0240877 A1 | 10/2007 | O'Malley et al. |
| 2008/0161453 A1 | 7/2008 | Lee et al. |
| 2008/0220567 A1 | 9/2008 | Mahler et al. |
| 2009/0036605 A1 | 2/2009 | Ver Meer |
| 2009/0084539 A1 | 4/2009 | Duan et al. |
| 2009/0118458 A1 | 5/2009 | Inabe |
| 2009/0131557 A1 | 5/2009 | Uyama et al. |
| 2009/0242850 A1 | 10/2009 | Park et al. |
| 2010/0012708 A1 | 1/2010 | Steward et al. |
| 2010/0089565 A1 | 4/2010 | Duan et al. |
| 2010/0210813 A1 | 8/2010 | Foder et al. |
| 2011/0003955 A1 | 1/2011 | Nishino et al. |
| 2011/0052444 A1 | 3/2011 | Hrametz et al. |
| 2011/0139314 A1 | 6/2011 | Ho et al. |
| 2011/0144223 A1 | 6/2011 | Sriram et al. |
| 2011/0162788 A1 | 7/2011 | Mizrahi |
| 2012/0090830 A1 | 4/2012 | O'Malley et al. |
| 2012/0178834 A1 * | 7/2012 | Linder ............... B01D 67/0006 521/27 |
| 2012/0305238 A1 | 12/2012 | Duan et al. |
| 2013/0062049 A1 | 3/2013 | Ren et al. |
| 2013/0256991 A1 | 10/2013 | Ramon et al. |

FOREIGN PATENT DOCUMENTS

| | | |
|---|---|---|
| JP | 59157151 A | 9/1984 |
| JP | 9096186 A | 4/1997 |
| WO | 9207024 A1 | 4/1992 |
| WO | 03014517 A1 | 2/2003 |
| WO | 2005052316 A2 | 6/2005 |
| WO | 2005059304 A1 | 6/2005 |
| WO | 2007101845 | 9/2007 |
| WO | 2010095139 | 8/2010 |

OTHER PUBLICATIONS

International Search Report and Written Opinion; International Application No. PCT/US2012/045552; International filing date: Jul. 5, 2012; Date of mailing Jan. 25, 2013; 8 pages.

International Search Report and Written Opinion; International Application No. PCT/US2012/054083; International filing date Sep. 7, 2012; Date of mailing Dec. 14, 2012 (8 pages).

Mather et al., "Shape Memory Polymer Research"; Annu. Rev. Mater. Res.; 39; pp. 445-471; (2009).

Qinghao Meng et al., "A Review of shape memory polymer composites and blends"; Composites: Part A, vol. 40; pp. 1661-1672 (2009).

PrimoSpire PR-250 Product Data Sheet, Solvay Specialty Polymers, Sep. 28, 2010, 3 pages.

Ren et al. "Development and Characterization of an Elastomeric Material for High-Pressure and High-Temperature Downhole Sealing Applications". Presentation at 2011 World Oil HPHT Drilling and Completion Conference; Abstract Date Mar. 11, 2011 (1 page).

Sun et al., "Preparation, characterization, and mechanical properties of some microcellular polysulfone foams", Journal of Applied Polymer Science, vol. 86, Issue 7, pp. 1692-1701, Nov. 14, 2002.

Takemoto et al., "Electrochemical Migration Tests of Solder Alloys in Pure Water", Corrosion Science, vol. 39, No. 8. pp. 1415-1430 (1997).

International Search Report for International Application No. PCT/US2012/061098; International filing date: Oct. 19, 2012; Date of mailing: Mar. 12, 2013 (3 pgs).

International Search Report for International Application No. PCT/US2012/059682; International filing date: Oct. 11, 2012; Date of mailing: Mar. 29, 2013 (4 pgs).

International Search Report for International Application No. PCT/US2012/057033; International filing date: Sep. 25, 2012; Date of mailing: Mar. 29, 2013 (4 pgs).

Chemical Abstracts Service, Colbumbus, Ohio, US; Mar. 31, 2000, Bloom, Paul D. et al.: "Synthesi of self-crosslinking poly (P-phenylene s", XP002734847; and Polymer Preprints (American Chemical Society, Division of Polymer Chemistry), ISSN: 0032-3934.

Extended European Search Report for EP application No. 128371531, Filing Date Sep. 25, 2012, Date of Mailing Feb. 9, 2015, 26 pages.

Korshak V V et al. "Some thermal characteristics of branched and crosslinked polyphenylenes", Polymer Science U.S.S.R, Pergamon Press, Oxford, vol. 15, No. 10, Jan. 1, 1973, pp. 2465-2470, XP024113209, ISSN: 0032-3950, DOI: 10.1016/0032-3950(73)90002.

Tour J M: "Soluble Oligo- and Polyphenylenes", Advanced Materials, Wiley—V C H Verlag GMBH & Co. KGAA, DE, vol. 6, No. 3, Mar. 1, 1994 (Mar. 1, 1994), pp. 190-198, XP000429216, ISSN: 0935-9648, DOIU: 10.1002/ADMA. 19940060303.

PCT International Search Report and Written Opinion; International Application No. PCT/US2013/069076; International Filing Date: Nov. 8, 2013; Date of Mailing: Feb. 27, 2014; pp. 1-9.

Stacy et al. "Molecular Weight Distribution of Polyphenylene Sulfide by High Temperature Gel Permeation Chromatography" Journal of Applied Polymer Science, vol. 32, pp. 3959-3969 (1986).

* cited by examiner

TOUGHENED SOLDER FOR DOWNHOLE APPLICATIONS, METHODS OF MANUFACTURE THEREOF AND ARTICLES COMPRISING THE SAME

CROSS REFERENCE TO RELATED APPLICATIONS

This application claims the benefit of an earlier filing date from U.S. Provisional Application Ser. No. 61/734,633 filed Dec. 7, 2012, the entire disclosure of which is incorporated herein by reference.

BACKGROUND

This disclosure relates to toughened solder for downhole applications, methods of manufacture thereof and articles comprising the same.

Metallic solders are generally used for bonding various components in electronic systems that are used in the downhole exploration and excavation of hydrocarbons. These metallic solders undergo embrittlement at the high temperatures encountered downhole. The high temperatures downhole facilitate the formation of intermetallics in the solder, which drive the embrittlement of the solder. It is desirable to prevent or to control this embrittlement to increase the life cycle of electronic systems.

SUMMARY

Disclosed herein is a solder composition comprising a metal or a metal alloy; and an electrically conductive high temperature polymeric composition; where the electrically conductive high temperature polymeric composition is dispersed homogeneously in the metal; and where the electrically conductive high temperature polymeric composition has a higher glass transition temperature or a melting point than the flow temperature of the metal or metal alloy; and where the metal or metal alloy forms a matrix of the solder composition.

Disclosed herein too is a method comprising mixing an electrically conductive high temperature polymeric composition with a metal matrix or a metal alloy to form the solder composition; where the electrically conductive high temperature polymeric composition is dispersed homogeneously in the metal; and where the electrically conductive high temperature polymeric composition has a higher glass transition temperature or a melting point than the flow temperature of the metal or metal alloy; where the metal or metal alloy forms a matrix of the solder composition.

DETAILED DESCRIPTION

Disclosed herein is a solder composition that comprises a metal and an electrically conductive high temperature polymeric composition. The electrically conductive high temperature polymeric composition comprises a high temperature polymer and an electrically conducting filler. The metal may be an alloy that is lead free, while the polymer is a high temperature polymer that has a glass transition temperature (Tg) and/or a melting point that is greater than the flow temperature of the solder. The electrically conductive high temperature polymeric composition is dispersed in a matrix of metal and toughens the metal against embrittlement and subsequent fatigue and fracture. The high temperature polymer is selected based on its ability to dissipate energy at temperatures of interest and its ability to be dispersed in the metal matrix. The solder composition is advantageous in that it prevents embrittlement of the metal solder and increases the life cycle of high temperature electronics used downhole. Maintenance costs are also reduced by virtue of the fact that life cycles of the high temperatures are increased.

The solder composition comprises a metal or a metal alloy that has a flow temperature below 350° C. The metal or metal alloy may or may not contain lead. In an exemplary embodiment, the solder preferably does not contain lead. Any metal or metal alloy having a melting point (also referred to herein as the "flow temperature") of 175° C. to 350° C. may be used as a base metal in the solder composition. The base metal is that metal or metal alloy that forms the largest weight percentage (hereinafter "wt %") of the solder composition. Examples of metals that may be used as the base metal are Babbitt metal, cadmium, bismuth, tin, lead, selenium, or a combination comprising at least one of the foregoing metals or metal alloys. Exemplary base metals are tin, lead or cadmium.

The solder composition generally comprises the base metal generally in an amount of 40 to 99 wt %, specifically 50 to 95 wt %, and more specifically 55 to 90 wt %, based on the total weight of the solder composition.

The solder composition may further comprise other secondary metals in smaller amounts than the base metal. The secondary metals may include some of the aforementioned listed base metals, but in amounts smaller than the amount of the base metal used in the solder composition. Exemplary secondary metals include silver, copper, antimony, zinc, nickel, lead, cadmium, tin, bismuth, selenium, Babbitt metal, copper, or the like. The secondary metals may be present in amounts of 1 wt % to 49.9 wt %, specifically 2 wt % to 40 wt %, and more specifically 4 wt % to 30 wt %, based on the total weight of the solder composition.

In an exemplary embodiment, the solder composition comprises tin as the base metal, with silver, copper and antimony as the secondary metals. In an exemplary embodiment, the silver is present in an amount of 3.5 to 7 wt %, copper in an amount of 1 to 4 wt % and antimony in an amount of 1 to 3 wt %, based on the total weight of the solder composition.

This solder composition has a melting temperature greater than or equal to 175° C., specifically greater than or equal to 220° C. and has a relatively wide plastic range, i.e., the difference in liquidus and solidus temperatures may be relatively large for such solder alloys. However, this is not a problem in the high temperature environment of an oil or gas well.

The high temperature polymer generally has a softening point or a melting point that is greater than the flow temperature of the metal in the solder composition. In an exemplary embodiment, the high temperature polymer has a glass transition temperature or a melting point that is greater than or equal to 175° C., specifically greater than or equal to 200° C., specifically greater than or equal to 250° C., and more specifically greater than or equal to 300° C. The high temperature polymer is electrically conducting. In one embodiment, the high temperature polymer may be intrinsically electrically conducting i.e., it comprises polymers that have conjugated carbon-carbon double bonds. In another embodiment, electrically conducting fillers are added to the high temperature polymers to convert normally electrically insulating polymers into electrically conducting polymers.

High temperature polymers from which the solder composition is formed include intrinsically electrically conducting polymers such as polyaniline, polypyrrole, polythiophene, polyacetylene, or a combination comprising at least one of the foregoing polymers.

Exemplary electrically insulating high temperature polymers that can be made electrically conducting by the addition of electrically conducting fillers are polyphenylene sulfide, polyphenylsulfone, self-reinforced polyphenylene, polyethersulfone, polyetherether ketone, polytetrafluoroethylene, polyaryletherketones, polyphenylene sulfone ureas, polybenzoxazoles, polyoxadiazoles, polybenzothiazinophenothiazines, polybenzothiazoles, polypyrazinoquinoxalines, polypyromellitimides, polyquinoxalines, polybenzimidazoles, polyoxindoles, polyoxoisoindolines, polydioxoisoindolines, polytriazines, polypyridazines, polypiperazines, polypyridines, polypiperidines, polytriazoles, polypyrazoles, polypyrrolidines, polycarboranes, polyoxabicyclononanes, polydibenzofurans, or the like, or a combination comprising at least one of the foregoing polymers.

Exemplary polyarylsulfones that can be used include polyphenylsulfone that are available from sources such as Solvay Specialty Polymers, Quadrant EPP, Centroplast Centro, Duneon, GEHR Plastics, Westlake Plastics, and Gharda Chemicals. Commercial grades of polyphenylsulfones include those with the trade names Radel®, Udel®, Ultrason®, and Gafone®. An example of a polyarylsulfone includes those that are commercially available under the trade name Astrel® from 3M. Exemplary polyphenylene sulfides include those with either a branched structure, such as those marketed under the trade name Ryton® by Chevron-Phillips, a linear structure, such as those marketed under the trade name Fortron® by Ticona, or a combination thereof. Exemplary self-reinforced polyphenylenes that can be used include those that are commercially available under the trade name PrimoSpire® PR-250 from Solvay Advanced Polymers. Exemplary polyethersulfones include those that are commercially available under the trade name Victrex PES® from ICI.

In an embodiment, the electrically conductive high temperature polymeric composition has an electrical conductivity from 0.1 Siemens per meter (S/m) to 500 S/m, specifically 100 S/m to 400 S/m, and more specifically 200 S/m to 300 S/m. The polymer is a high temperature material that resists thermal degradation at temperatures where many polymers fail.

According to an embodiment, the high temperature polymers can be crosslinked. Accordingly, there is provided, in an embodiment, a solder composition that includes a crosslinked product of the aforementioned polymers or a combination comprising at least one of the foregoing polymers. Exemplary crosslinked products include crosslinked polyarylenes, crosslinked polyaryl sulfides, crosslinked polyaryl sulfones, and crosslinked polysulfones. In a particular embodiment, the crosslinked product is crosslinked polyphenylene sulfide (x-PPS), crosslinked polyphenylsulfone (x-PPSU), crosslinked self-reinforced polyphenylene (x-SRP), crosslinked polyethersulfone (x-PESU), or a combination comprising at least one of the foregoing. Consequently, in one embodiment, the crosslinked product includes a crosslink between, for example, x-PPS, x-PPSU, x-SRP, x-PESU, or a combination comprising at least one of the foregoing. Descriptions of x-PPS, x-PPSU, and x-SRP and processes for making each are described in U.S. patent application Ser. Nos. 13/179,230, 13/229,923, 13/246,250, 13/303,688, and 13/343,264, the disclosure of each of which application is incorporated herein in its entirety.

The crosslinked product can be prepared by oxidative crosslinking the aforementioned high temperature polymers in the presence of a molecular crosslinking agent. In an embodiment, the molecular crosslinking agent can be oxygen (pure or from a mixture of gases including oxygen, e.g., air with or without an inert gas such as nitrogen, helium, argon, carbon dioxide), an inorganic oxidant (e.g., magnesium oxide), organic oxidant (e.g., dicumyl peroxide), or the like. In an embodiment, crosslinking is carried out in air. Ambient pressure or elevated pressure (>1 atmosphere) can be used, or a partial pressure lower than ambient can be used. Crosslinking of the base polymer can be carried out at a temperature of about 200° C. to about 400° C., in another embodiment about 250° C. to about 390° C., and in another embodiment about 300° C. to about 380° C. The curing time is for a total time of less than or equal to 200 hours, specifically less than 75 hours. In contrast to the base polymer, the crosslinked polymer is not soluble in solvents such as N-methyl-2-pyrrolidone (NMP) or N,N-dimethylformamide (DMF), which can be used to confirm that molecular crosslinking occurred. The crosslinked product also shows a rubber-like plateau having relatively high modulus at a temperature above its Tg. In an embodiment, the Tg of crosslinked polyphenylene increases from 120° C. for the polymer (polyphenylene) to 180° C. for the crosslinked polyphenylene, as determined using dynamic mechanical analysis (DMA), which can be used to determine the elastic and storage moduli of the crosslinked polymer.

According to an embodiment, the solder composition can contain an additional polymer that may or may not be high temperature polymer. In a further embodiment, the high temperature polymers can be crosslinked alone or in the presence of the additional polymer in order to obtain the desired mechanical or chemical properties of the solder composition. In an embodiment, no additional polymer is present during crosslinking the high temperature polymer to form the crosslinked product.

If used, in order to maintain the desired properties of the solder composition containing the polymer or crosslinked product, an amount of the additional polymer can be limited, being present for example in amount of 0.01 to 20 weight percent (wt. %), 0.1 to 10 wt. %, or 1 to 5 wt % of the total weight of the high temperature polymer, crosslinked polymer, or combination thereof. For example, if used, an aromatic thermoplastic polymer can be present, such as aromatic polyamides, polyimides, polyetherimides, polyaryletherketones (PAEK), or the like, or combinations comprising at least one of the foregoing. Additional polymers containing oxygen include, for example, acetal resins (e.g., polyoxymethylene (POM)), polyester resins (e.g., poly(ethylene terephthalate) (PET), poly(butylene terephthalate) (PBT), and poly(ethylene naphthalate) (PEN)), polyarylates (PAR), poly(phenylene ether) (PPE), polycarbonate (PC), aliphatic polyketones (e.g., polyketone (PK)), poly(ether ketones) (polyetherketone (PEK), polyetherketoneketone (PEKK), and polyetherketone etherketone ketone (PEKEKK)), and acrylic resins (e.g., polymethylmethacrylate (PMMA)) can be used. The additional polymer can be linear or branched, homopolymers or copolymers, and used alone or in combination with one or more other aromatic thermoplastic polymers. Copolymers include random, alternating, graft, and block copolymers, the block copolymers having two or more blocks of different homopolymers, random copolymers, or alternating copolymers. The thermoplastic polymers can further be chemically modified to include, for example, functional groups such as halogen, alcohol, ether, ester, amide, etc. groups, or can be oxidized, hydrogenated, and the like. A reactive elastomer or fluoropolymer can be blended with the polymer or crosslinked product (before crosslinking to form the crosslinked polymer) and grafted thereto to increase flexibility of the solder composition. Examples of reactive elastomers or fluoropolymers include polytetrafluoroethylene (PTFE), nitrile-butyl rubber (NBR), hydrogenated nitrile-butyl rubber (HNBR), high fluorine content fluoroelastomers rubbers such as those in the FKM family and marketed under the tradename VITON® fluoroelastomers (available from FKM-Industries) and perfluoroelastomers such as FFKM (also available from FKM-Industries) and marketed under the tradename KALREZ® perfluoroelastomers (available from DuPont), and VECTOR® adhesives (available from Dexco LP), organopolysiloxanes such as functionalized or unfunctionalized polydimethylsiloxanes (PDMS), tetrafluoroethylene-propylene elastomeric copolymers such as those marketed under the tradename AFLAS® and marketed by Asahi Glass Co., ethylene-propylene-diene monomer (EPDM) rubbers, polyvinylalcohol (PVA), and the like, and combinations comprising at least one of the foregoing polymers.

Crosslinking or annealing can change the crystallinity, thus the conductivity, and that will be optimized to maximize the thermoelectric effect.

The electrically conductive filler material of the solder composition includes a carbonaceous material. Exemplary carbonaceous materials are carbon fiber, carbon nanotubes, carbon black, acetylene black, activated carbon, graphite, graphene, or a combination comprising at least one of the foregoing carbonaceous materials. The carbon nanotubes can be single walled nanotubes (SWNTs), double walled carbon nanotubes (DWTS) or multi-walled nanotubes (MWNTs).

Carbonaceous material, from which the filler material is formed, has an average size, in at least one dimension, of less than one micrometer ($\mu m$). As used herein "average particle size" refers to the number average particle size based on the largest linear dimension of the particle (sometimes referred to as "diameter"). Particle size, including average, maximum, and minimum particle sizes, may be determined by an appropriate method of sizing particles such as, for example, static or dynamic light scattering (SLS or DLS) using a laser light source. The carbonaceous material can be monodisperse, where all particles are of the same size with little variation, or polydisperse, where the particles have a range of sizes and are averaged. Generally, polydisperse carbonaceous material is used. Carbonaceous material of different average particle size can be used, and in this way, the particle size distribution of the carbonaceous material may be unimodal (exhibiting a single size distribution), bimodal exhibiting two size distributions, or multimodal, exhibiting more than one particle size distribution. In an embodiment, the carbonaceous material has a length dimension that is much greater than its diameter, as with carbon nanotubes. Furthermore, the carbonaceous material can be used as received from a commercial source or can be processed after receipt. In an embodiment, the carbonaceous material as-received is processed by decreasing the length of a size, for example, a length of carbon nanotubes.

The carbonaceous material can have a density for example, but not limited to, from 1.0 gram per cubic centimeter (g/cm3) to 2.5 g/cm3, specifically 1.0 g/cm3 to 2.2 g/cm3, and more specifically from 1.0 g/cm3 to 2.0 g/cm3. The surface area of the carbonaceous material is high and can be greater than 300 m2/g, and in a specific embodiment, 300 m2/g to 1800 m2/g, specifically 500 m2/g to 1500 m2/g.

In an embodiment, the carbonaceous material is a graphene including nanographene and graphene fibers (i.e., graphene particles having an aspect ratio of greater than 10, where the graphene particles form an interbonded chain). Graphene and nanographene are effectively two-dimensional particles of nominal thickness, having of one or more layers of fused hexagonal rings with an extended delocalized $\pi$-electron system, layered and weakly bonded to one another through $\pi$-$\pi$ stacking interaction. Graphene in general, including nanographene, can be a single sheet or a stack of several sheets having both micro- and nano-scale dimensions, such as in some embodiments an average particle size of 1 to 20 $\mu m$, specifically 1 to 15 $\mu m$, and an average thickness (smallest) dimension in nano-scale dimensions of less than or equal to 50 nm, specifically less than or equal to 25 nm, and more specifically less than or equal to 10 nm. An exemplary nanographene can have an average particle size of 1 to 5 $\mu m$, and specifically 2 to 4 $\mu m$. In addition, smaller nanoparticles or sub-micron sized particles may be combined with the carbonaceous material having an average particle size of greater than or equal to 1 $\mu m$. In a specific embodiment, the carbonaceous material is a carbon fiber.

Besides the high temperature polymer, the filler material includes a metal disposed on the carbonaceous material. The metal can be disposed on the carbonaceous material by a chemical interaction, physical interaction, or a combination comprising at least one of the foregoing. The metal can be physisorbed or chemisorbed on a portion of or a complete surface of the carbonaceous material. Further, the metal can be bonded to the carbonaceous material by an ionic bond, covalent bond, dative bond, hydrogen bond, coordinate bond, or a combination comprising at least one of the foregoing.

Exemplary metals that are disposed on the carbonaceous material include cadmium, chromium, cobalt, brass, iridium, iron, lead, molybdenum, nickel, platinum, ruthenium steel, selenium, tin, titanium, tungsten, vanadium, zinc, or a combination comprising at least one of the foregoing metals. Moreover, the metal disposed on the carbonaceous material can be present in an amount effective such that the solder composition has a Seebeck effect or Peltier effect that respectively allows efficient power generation or cooling of an article made of the solder composition. In an embodiment, the metal has a conductivity from $3 \times 10^7$ Siemens per meter (S/m) or less, specifically $3 \times 10^7$ S/m to $5 \times 10^5$, and more specifically $2 \times 10^7$ to $2 \times 10^6$ S/m.

Metals disposed on carbonaceous material are commercially available. Alternatively, a metal disposed on carbonaceous material can be made from the carbonaceous material and metal raw materials. In one embodiment, nickel disposed on carbon fiber can be prepared by activating the carbon fiber in a solution of butadiene palladium chloride, drying, and then nickel coating in a metallization bath at a basic pH containing nickel chloride hexahydrate, citric acid, and dimethyl aminoborane.

In one embodiment, the electrically conductive filler particles are non-carbonaceous (i.e., they do not contain any carbon). Such non-carbonaceous electrically conductive filler particles include metal powders, electrically conductive ceramic powders, or combinations thereof. Exemplary metal powders include copper, aluminum, cadmium, chromium, cobalt, brass, iridium, iron, lead, molybdenum, nickel, platinum, ruthenium steel, selenium, tin, titanium, tungsten, vanadium, zinc, or the like, or a combination comprising at least one of the foregoing metals.

Examples of electrically conductive ceramics are indium tin oxide, tin oxide, antimony tin oxide, antimony oxide, fluorine doped tin oxide (FTO), doped zinc oxide, or the like, or a combination comprising at least one of the foregoing electrically conductive ceramics.

In an embodiment, the solder composition also includes an additive. Additive, as used herein, includes a reinforcing or non-reinforcing additive. Reinforcing additives include, for example, silica, glass fiber, and the like, which can be added to the solder composition to increase strength. Non-reinforcing additives such as polytetrafluoroethylene (PTFE), molybdenum disulfide (MoS2), and the like can be added to the solder composition to increase lubrication. Other additives, such as a inorganic nanoparticles, nanoclays, or the like, can be incorporated into the solder composition to increase the strength and elongation of the material. The additives can further be functionalized to include grafts or functional groups to adjust properties such as solubility, surface charge, hydrophilicity, lipophilicity, and other properties. Combinations comprising at least one of the foregoing additives can be used. The additive can be present in the solder composition in an amount from 0.5 wt. % to 35 wt. %, specifically 0.5 wt. % to 20 wt. %, and more specifically 0.5 wt % to 15 wt %, based on the weight of the solder composition.

The electrically conductive filler can be present in the solder composition in an amount from 1 wt % to 70 wt %, specifically 5 wt % to 70 wt %, and more specifically 5 wt % to 60 wt %, based on a weight of the polymer in the solder composition. The metal disposed on the carbonaceous material can be present in an amount from 0.5 wt. % to 70 wt. %, 0.5 wt. % to 50 wt. %, and more specifically 0.5 wt. % to 30 wt. %, based on the weight of the carbonaceous material.

The solder composition comprises the electrically conductive high temperature polymeric composition in an amount of 1 to 50 wt %, specifically 3 to 20 wt %, and more specifically 5 to 15 wt %, based on the total weight of the solder composition.

The solder composition can be prepared by combining a polymer and a filler material to form an electrically conductive high temperature polymeric composition. The electrically conductive high temperature polymeric composition is then blended with the metal to form the solder composition. Such combining includes, for example, blending, mixing, milling, and the like.

The electrically conductive high temperature polymeric composition is first processed by mixing the high temperature polymer with the electrically conducting filler and any other desired additives. The mixing may include dry mixing or solution mixing. In one embodiment, in one method of manufacturing the electrically conductive high temperature polymeric composition, the high temperature polymer is mixed with the electrically conductive filler and a desired additive under conditions that involve the use of shear force, extensional force, compressive force, ultrasonic energy, electromagnetic energy, thermal energy or combinations comprising at least one of the foregoing forces or forms of energy. These forces and forms of energy are applied in processing equipment that comprises a single screw, multiple screws, intermeshing co-rotating or counter rotating screws, non-intermeshing co-rotating or counter rotating screws, reciprocating screws, screws with pins, screws with screens, barrels with pins, rolls, rams, helical rotors, or combinations comprising at least one of the foregoing.

In one embodiment, the mixing is conducted in an extruder. The extruders used in the invention may have a single screw, multiple screws, intermeshing co-rotating or counter rotating screws, non-intermeshing co-rotating or counter rotating screws, reciprocating screws, screws with pins, screws with screens, barrels with pins, rolls, rams, helical rotors, or combinations including at least one of the foregoing. The melt blending of the composites involves the use of shear force, extensional force, compressive force, ultrasonic energy, electromagnetic energy, thermal energy or combinations including at least one of the foregoing forces or forms of energy.

The barrel temperature on the extruder during compounding can be set at the temperature where at least a portion of the high temperature polymer has reached a temperature greater than or equal to about the melting temperature, if the resin is a semi-crystalline polymer or the glass transition temperature if the polymer is amorphous.

The electrically conductive high temperature polymeric composition may be subject to multiple blending and forming steps if desirable. For example, the electrically conductive high temperature polymeric composition may first be extruded and formed into pellets. The pellets may then be fed into a molding machine where it may be formed into any desirable shape or product. Alternatively, the electrically conductive high temperature polymeric composition emanating from a single melt blender may be formed into sheets or strands and subjected to post-extrusion processes such as annealing, uniaxial or biaxial orientation.

Solution blending may also be used to manufacture the electrically conductive high temperature polymeric composition. The solution blending may also use additional energy such as shear, compression, ultrasonic vibration, or the like, to promote homogenization of fillers with the high temperature polymer. In one aspect, a high temperature polymer suspended in a fluid may be introduced into an ultrasonic sonicator along with any of the foregoing fillers (electrically conducting fillers and other desired additives). The mixture may be solution blended by sonication for a time period effective to disperse the fillers into the high temperature polymer. The high temperature polymer along with the fillers may then be dried, extruded and molded if desired.

The electrically conductive high temperature polymeric composition can be comminuted, e.g., by grinding or milling to produce powders for the solder composition. The average particle size of the powder is 1 micrometer to 100 micrometers, specifically 2 micrometers to 30 micrometers, specifically 5 micrometers to 20 micrometers.

The powders are then mixed with the metal in an extruder to produce the solder composition. The metal may also be in the form of a powder and may be dry blended (in a Waring blender or in a Henschel mixer) with the powdered electrically conductive high temperature polymeric composition prior to extrusion. In one embodiment, the extrusion is conducted at a temperature that is greater than the flow temperature of the metal, but lower than the glass transition temperature or the melting point of the powdered electrically conductive high temperature polymeric composition. In another embodiment, the extrusion temperature is conducted at a temperature that is greater than the flow temperature of the metal and greater than the glass transition temperature or the melting point of the powdered electrically conductive high temperature polymeric composition as well.

In one embodiment, in one method of using the solder composition, the solder composition emanating from the extruder is then used to solder high temperature electronic components that are used downhole. The solder is applied to two opposing surfaces of an article that are to be bound together at an elevated temperature and the opposing surfaces are then pressed against one another to permit the solder composition to bind them together.

The solder composition and articles made therefrom have beneficial properties. In an embodiment, the solder composition has a thermal decomposition temperature greater than 200° C., specifically greater than 300° C., and more specifically greater than 350° C. The solder composition has an electrical has an electrical conductivity from 102 S/m to 105 S/m, specifically 102 S/m to 104 S/m, and more specifically 103 S/m to 104 S/m.

The solder composition is advantageous in that it prevents embrittlement of the metal solder and increases the life cycle of high temperature electronics used downhole. Maintenance costs are also reduced by virtue of the fact that life cycles of the high temperature electronics (used downhole) are increased.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention.

What is claimed is:

1. A solder composition comprising:
a metal or a metal alloy; and
an electrically conductive high temperature polymeric composition; where the electrically conductive high temperature polymeric composition is dispersed homogeneously in the metal; and where the electrically conductive high temperature polymeric composition has a higher glass transition temperature or a melting point than the flow temperature of the metal or metal alloy; where the metal or metal alloy forms a matrix of the solder composition; where the electrically conductive high temperature polymeric composition comprises a high temperature polymer and an electrically conducting filler; where the high temperature polymer has a glass transition temperature or a melting point that is greater than or equal to 175° C.; where the high temperature polymer comprises polyether sulfone, polyetherether ketone, polyaryletherketones, polyphenylene sulfone ureas, polybenzoxazoles, polyoxadiazoles, polybenzothiazinophenothiazines, polybenzothiazoles, polypyrazinoquinoxalines, polypyromellitimides, polyquinoxalines, polybenzimidazoles, polyoxindoles, polyoxoisoindolines, polydioxoisoindolines, polytriazines, polypyridazines, polypiperazines, polypyridines, polypiperidines, polytriazoles, polypyrazoles, polypyrrolidines, polycarboranes, polyoxabicyclononanes, polydibenzofurans, or a combination comprising at least one of the foregoing polymers.

2. The solder composition of claim 1, where the electrically conducting filler comprises a carbonaceous material.

3. The solder composition of claim 2, wherein the carbonaceous material comprises carbon fiber, carbon nanotubes, carbon black, graphite, graphene, or a combination comprising at least one of the foregoing carbonaceous materials.

4. The solder composition of claim 2, wherein the carbonaceous materials are coated with a metal; where the metal is selected from the group consisting of cadmium, chromium, copper, aluminum, cobalt, brass, iridium, iron, lead, molybdenum, nickel, platinum, ruthenium steel, selenium, tin, titanium, tungsten, vanadium, zinc, and a combination comprising at least one of the foregoing metals.

5. The solder composition of claim 2, where the electrically conducting filler comprises a metal powder; where the metal for the metal powder is selected from the group consisting of cadmium, chromium, copper, aluminum, cobalt, brass, iridium, iron, lead, molybdenum, nickel, platinum, ruthenium steel, selenium, tin, titanium, tungsten, vanadium, zinc, and a combination comprising at least one of the foregoing metals.

6. The solder composition of claim 1, where the electrically conductive high temperature polymeric composition has an average particle size of 1 micrometers to 100 micrometers.

7. The solder composition of claim 1, where the solder composition has an electrical conductivity from $10^2$ Siemens per meter to $10^5$ Siemens per meter.

8. The solder composition of claim 1, where the electrically conductive high temperature polymeric composition has an electrical conductivity from 0.1 Siemens per meter to 500 Siemens per meter.

9. The solder composition of claim 1, where the metal or a metal alloy that has a flow temperature below 350° C.

10. The solder composition of claim 9, where the metal or metal alloy comprises a base metal and a secondary metal; where the base metal is selected from the group consisting of cadmium, bismuth, tin, lead, selenium, or a combination comprising at least one of the foregoing metals or metal alloys.

11. The solder composition of claim 9, where the secondary metal is selected from the group consisting of cadmium, bismuth, tin, lead, selenium, or a combination comprising at least one of the foregoing metals or metal alloys.

* * * * *